United States Patent [19]

Miller

[11] Patent Number: 4,902,856
[45] Date of Patent: Feb. 20, 1990

[54] REUSABLE CABLE JOINT COVER

[75] Inventor: John M. Miller, Harrow, England

[73] Assignee: British Telecommunications, London, United Kingdom

[21] Appl. No.: 130,574

[22] Filed: Dec. 9, 1987

[51] Int. Cl.⁴ ............................................. H02G 15/08
[52] U.S. Cl. .................................. 174/91; 174/21 R; 174/93
[58] Field of Search .................... 174/21 R, 91, 92, 93

[56] References Cited

U.S. PATENT DOCUMENTS

| | | | |
|---|---|---|---|
| 707,055 | 8/1902 | Earl | 174/91 |
| 2,996,567 | 8/1961 | Channell et al. | 174/92 |
| 3,130,259 | 4/1964 | Rischard et al. | 174/93 |
| 3,188,382 | 6/1965 | Fuss | 174/91 |
| 3,869,561 | 3/1975 | Wettre | 174/91 X |
| 4,332,975 | 6/1982 | Dienes | 174/77 R X |
| 4,347,402 | 8/1982 | Reyners | 174/21 R X |
| 4,736,072 | 4/1988 | Hvidsten | 174/91 X |

FOREIGN PATENT DOCUMENTS

| | | | |
|---|---|---|---|
| 1440855 | 11/1968 | Fed. Rep. of Germany | 174/93 |
| 24515 | 7/1971 | Japan | 174/93 |
| 2193605 | 2/1988 | United Kingdom | 174/93 |

Primary Examiner—Morris H. Nimmo
Attorney, Agent, or Firm—Nixon & Vanderhye

[57] ABSTRACT

A cable joint cover for protecting a cable joint consisting of a hollow sleeve, and two endcaps which can be permanently sealed to the cables. One endcap is of smaller diameter than the sleeve so that the sleeve can slide over that endcap to expose the joint.

9 Claims, 7 Drawing Sheets

Fig. 2a
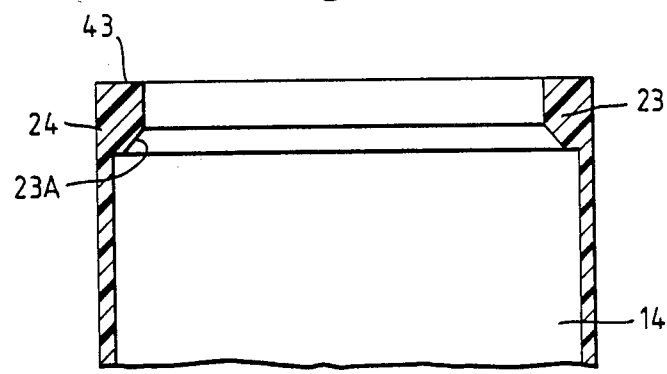
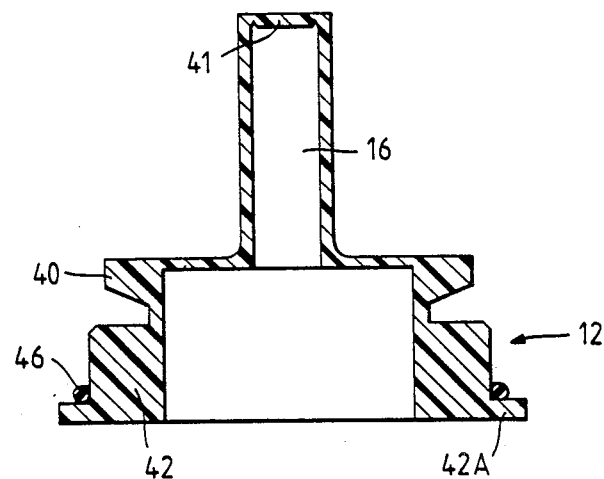
Fig. 2b

REUSABLE CABLE JOINT COVER

This invention relates to a reusable cable joint cover for protecting joints between telecommunications or power cables.

Joints between telecommunications or power cables need to be protected against mechanical damage and the effects of the surrounding environment. Such protection means should be removeable so as to permit access to the cable joint for inspection and maintenance. Covers incorporating heat-shrinkable plastics and thermoplastic glues are commonly used to protect joints between up to four different cables. For large diameter cables the amount of heat required for sealing and re-opening can cause damage to the underlying cables.

Rigid cable covers provide greater mechanical protection to the enclosed joint than do heat-shrinkable covers and have the advantage of improving ease of access. Such covers generally comprise a cylindrical sleeve split longitudinally so as to fit over the cable joint and sealed by mechanical means. Effective sealing against ingress of water is frequently a problem with such covers.

According to one aspect of the present invention there is provided a reusable cable joint cover for protecting joints between telecommunications or power cables comprising a hollow sleeve, two end-caps respectively permanently sealable onto said cables, and respectively releasably sealable one to each end of the hollow sleeve, one end-cap being of smaller external diameter than the internal diameter of the hollow sleeve so that the cylindrical sleeve can slide over that end-cap so as to expose the cable joint, at least one of the end caps being sealable to the hollow sleeve by a clamp member which interacts with respective flange members of the end cap and the sleeve.

Preferably the hollow sleeve is rigid and circular. Optionally one or each end-cap comprises a valve so as to enable the cable joint cover to be pressurized.

According to another aspect of the present invention there is provided a re-usable cable joint cover for protecting joints between telecomminication or power cables, the cover comprising two hollow sleeves butted together and releasably sealable, two end caps respectively permanently sealable on to the cable, and respectively releasably sealable one to each of the respective non-abutting ends of the hollow sleeve, the end caps each being of smaller external diameter than the internal diameter of the cylindrical sleeves whereby each sleeve can slide over its respective end cap so as to expose the cable joint.

Two specific embodiments of the present invention will now be described, by way of example only, with reference to the accompanying drawings in which:

FIGS. 2a and 2b are sectional views of one end-cap and that end of the cylindrical sleeve into which it fits;

Figure 1:
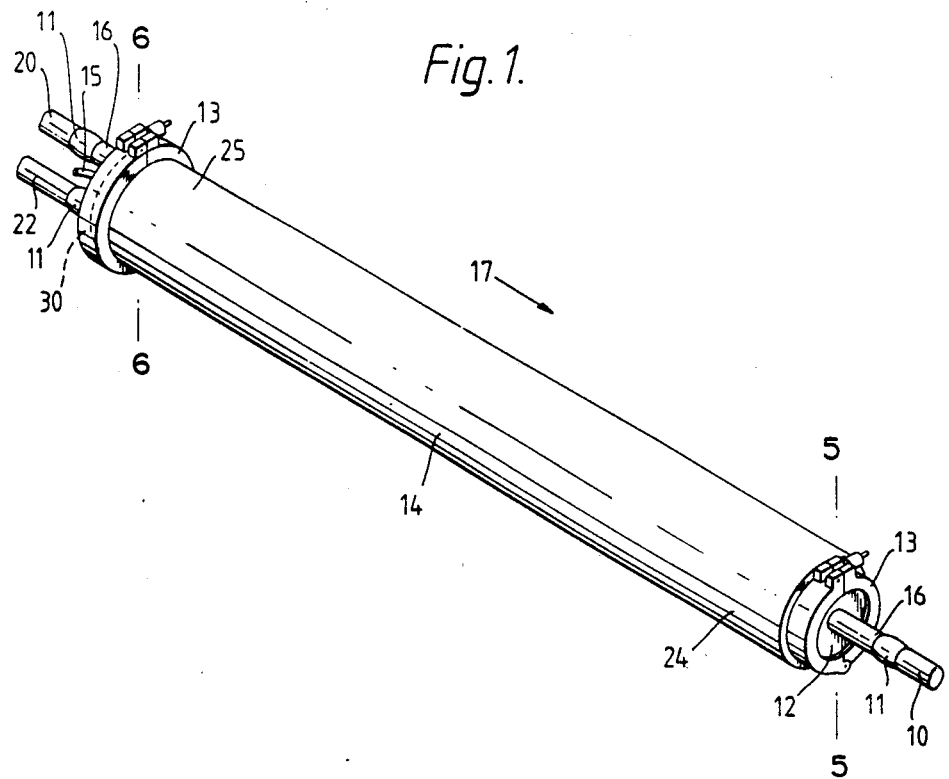
FIG. 1 is a diagrammatic view of a cable joint cover according to an embodiment of the invention.

FIG. 1 shows a reusable cable joint cover in assembled form when protecting a cable joint between a single cable 10 and a pair of cables 20, 22. The cable joint cover comprises a rigid cylindrical sleeve 14 fabricated from a conventional rigid material which is sealed by circular end-caps 12,30 which each have ports 16 through which the cables to be jointed are passed and to which they are sealed by way of heat shrink joints 11. The end-cap 30 comprises a valve 15 so as to allow the cable joint cover to be pressurized. End-cap 12 is of smaller external diameter than the internal diameter of cylindrical sleeve 14 and can form a releasable water tight seal to the inner face of end 24 of cylindrical sleeve 14. End-cap 30 is of equal external diameter to the external diameter of cylindrical sleeve 14 and can form a releasable water tight seal to the outer face of end 25 of cylindrical sleeve 14. Each end-cap 12,30 is releasably secured to its respective end 24,25 of cylindrical sleeve 14 by means of an adjustable circular clamp 13. Removal of the circular clamps 13 allows cylindrical sleeve 14 to be slid over end-cap 12 in the direction indicated by arrow 17 so as to expose the cable joint.

FIGS. 2a and 2b show end-cap 12 and end 24 of cylindrical sleeve 14 prior to sealing. End-cap 12 comprises a flange 40 surrounding the port 16 which initially has a knock-out end 41 so as to enable the unjointed cable 10 to be passed through into cylindrical sleeve 14. The cap 12 has a cylindrical body 42 with a flange 42A, there being an "0" ring 46 in the angle between body 42 and flange 42A. The flange 42A is of smaller external diameter than the internal diameter of cylindrical sleeve 14 so that the end cap 12 can be fitted into cylindrical sleeve 14 from end 25 so that port 16 and flange 40 extend outwards beyond end 24 of cylindrical sleeve 14. The end 24 has an internal lip 23 with an angled flat surface 23A.

Figure 3:
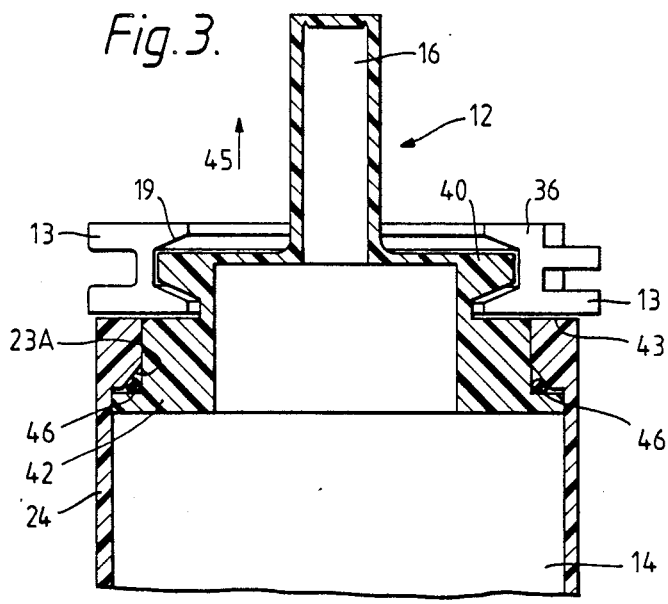
FIG. 3 is a sectional view of the end-cap plus clamp and that end of the cylindrical sleeve on to which it fits.
Figure 4:
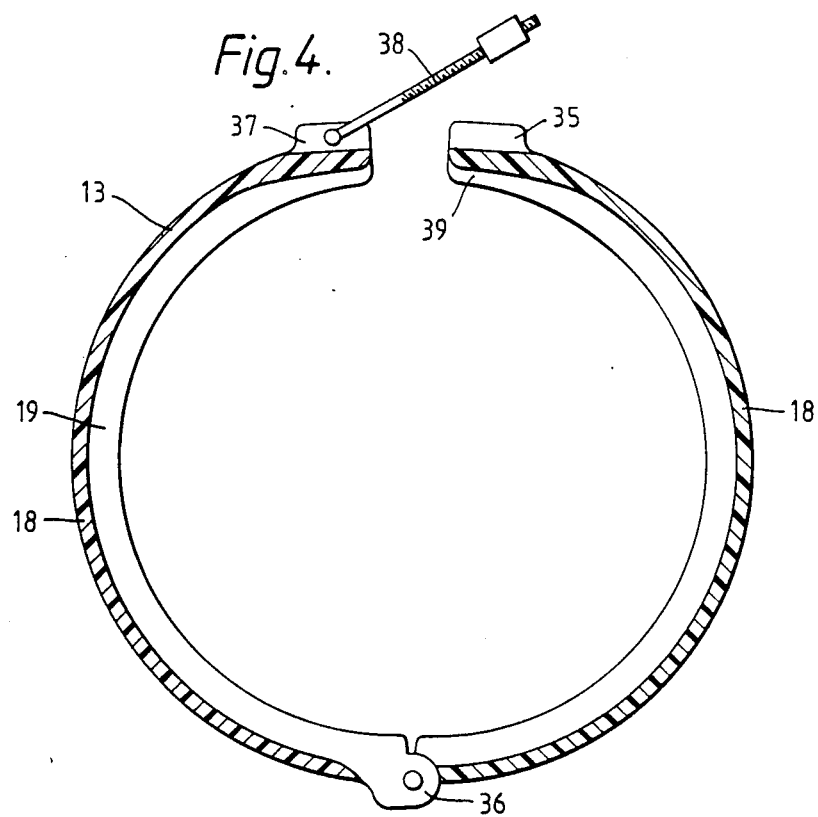
FIG. 4 is a view of the adjustable circular clamp.

Referring to FIG. 3 end-cap 12 is releasably secured to end 24 of cylindrical sleeve 14 by means of adjustable circular clamp 13 comprising inner faces 19 angled so as to engage flange 40 and compress the "0" ring 46 against surface 23A to form a releasable water tight seal. Referring to FIG. 4 circular clamp 13 comprises two semi-circular members 18 hinged at joint 36 so as to enable fitting around flange 40. Circular clamp 13 is tightened using screw bolt 38 which is pivotally secured at open end 37 of one semi-circular member 18 and locks into recess 33 of open end 39 of the opposing semi-circular member. Tightening of circular clamp 13 forces end-cap 12 axially outwards from cylindrical sleeve 14 in the direction of arrow 45 compressing O-ring 46 and forming a watertight seal.

To unseal and re-open end 24 of cylindrical sleeve 14 the steps described above are reversed.

Figure 8:
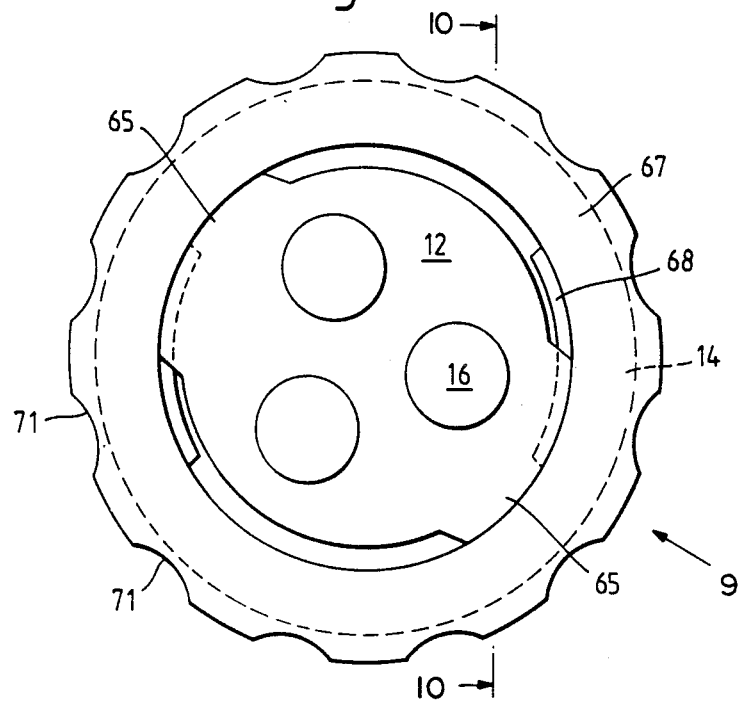
FIG. 8 is an end view of an assembled cable joint cover with an alternative fixing arrangement of the end cap using a clamp ring.
Figure 9:
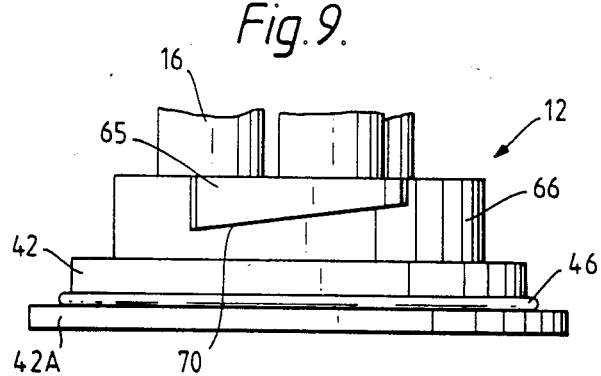
FIG. 9 is a side view of the end cap of FIG. 8 (dissembled from the sleeve) in the direction of arrow IX.
Figure 10:
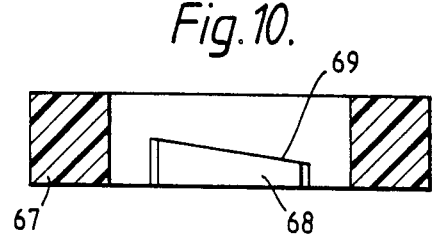
FIG. 10 is a sectional view of the clamp ring of FIG. 8 (dissembled from the sleeve) on the line X—X.

An alternative method of releasably securing the end cap 12 is shown in FIGS. 8, 9 and 10 to which reference is now made. In this case the end cap 12 shown as having three cable ports 16 has a circular portion 66 which has two outwardly extending flanges 65. The flanges 65 taper laterally of the direction of insertion to provide a wedge shaped locking portion.

To secure the end cap 12 to the cylindrical sleeve 14 a clamp ring 67 is provided. The clamp ring 67 has two inwardly extending flanges 68 which have a corresponding opposite taper to the locking portions of the end cap 12.

In use when the end cap 12 and cylindrical sleeve 14 have been positioned with respect to each other, the flanges 68 of the clamp ring 67 are passed through the gap between the flanges 65 of the end cap 12. The clamp ring 67 is now rotated so that face 69 of the flange 68 co-operates with face 70 of the flange 65 in the manner of a screw thread, thus effecting sealing of the end cap 12 to the cylinder 14. To facilitate rotation of the clamp ring 67 the periphery may include indentations 71 to form finger grips or to permit attachment of a C-spanner for example.

Again to unseal and re-open the end 24 of the cylindrical sleeve 14, the steps hereinbefore described are reversed.

Figure 5A:
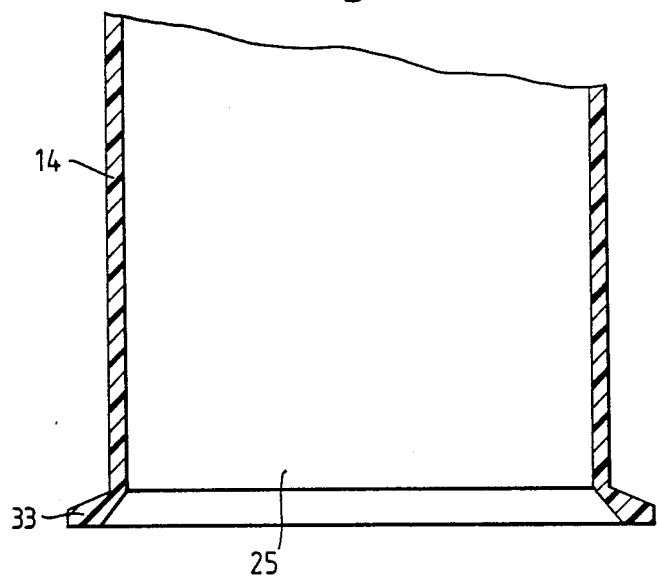
FIGS. 5a and 5b are part-sectional views of one end of the cable joint cover along line V—V of FIG. 1.
Figure 5B:
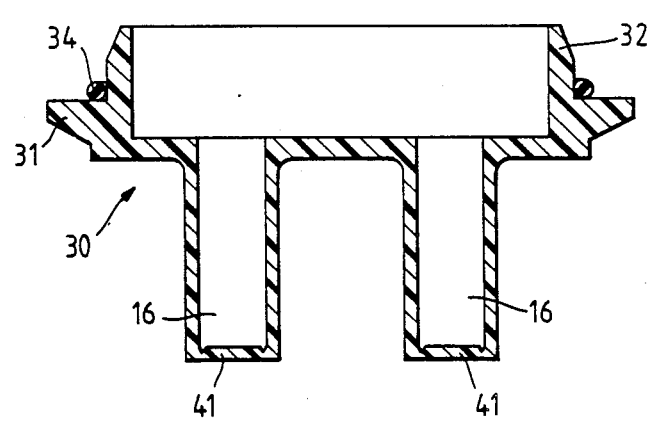
Figure 6:
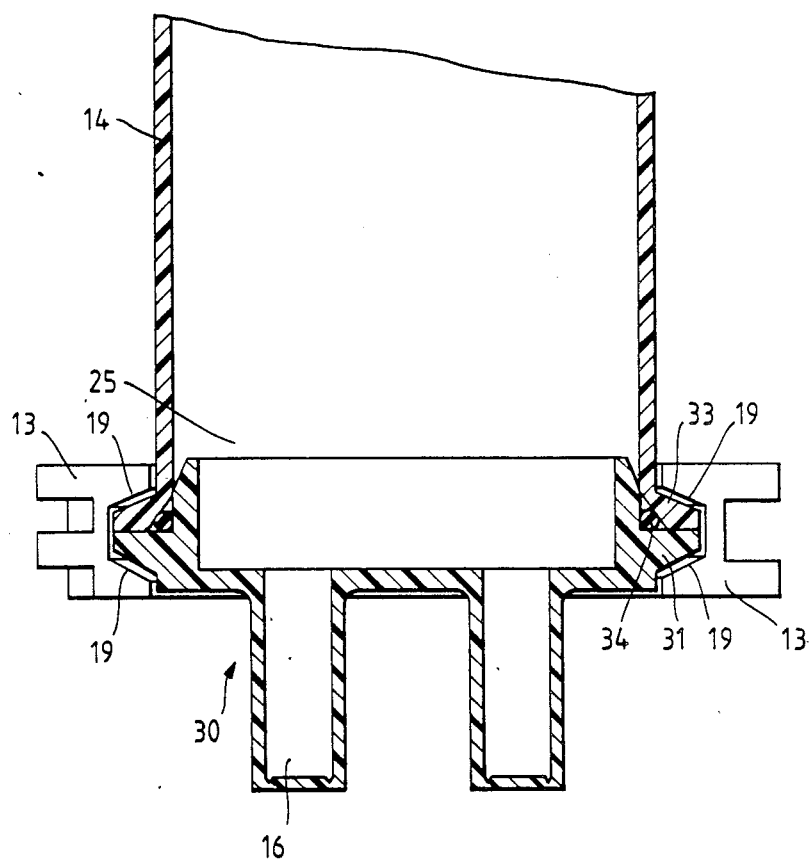
FIGS. 6 is a part sectional view of one end of the cable joint cover along line VI—VI of FIG. 1.

FIGS. 5a and 5b and FIG. 6 show end-cap 30 and end 25 of cylindrical sleeve 14 before and after sealing. End-cap 30 is of equal external diameter to the external diameter of cylindrical sleeve 14 and comprises flange 31, inner section 32 and one or more ports 16 with knock-out ends 41 so as to enable the unjointed cables 20,22 to be passed through into cylindrical sleeve 14. Inner section 32 fits into end 25 and flange 31 butts up against flange 33 of cylindrical sleeve 14 thereby compressing O-ring 34. End-cap 30 is releasably secured to end 25 by means of circular clamp 13 which engages flanges 31,33.

To unseal and re-open end 25 of cylindrical sleeve 14 the steps described above are reversed.

The assembly of the reusable cable joint cover so as to protect a cable joint will now be described with reference to FIG. 1. Prior to jointing of cable 10 to cables 20,22, end-cap 12 is inserted into cylindrical sleeve 14 from end 25 and cable 10 passed through port 16. End-cap 12 and cylindrical sleeve 14 are then slid along cable 10 until the end of cable 10 to be jointed is exposed. Cables 20,22 are passed through ports 16 of end-cap 30, and jointed to cable 10.

Once formed, the cable joint is protected by sliding the cylindrical sleeve 14 over it and securing the end-caps 12,30. The cable joint can be pressurized by application of a vacuum to valve 15.

To re-open, the cable joint cover should be returned to atmospheric pressure by admitting air via valve 15 before removing circular clamps 13. Cylindrical sleeve 14 can then be slid over end-cap 12 in the direction shown by arrow 17 so as to expose the cable joint for inspection and maintenance.

To reseal the cable joint cover over the cable joint the steps described above are carried out in reverse. No replacement parts are required and the heat-shrink seals remain undisturbed.

Figure 7A:
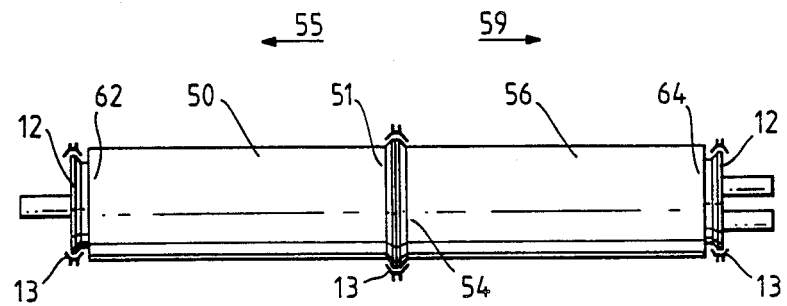
FIGS. 7a and 7b are views of a second embodiment of the invention being used to protect a cable joint.
Figure 7B:
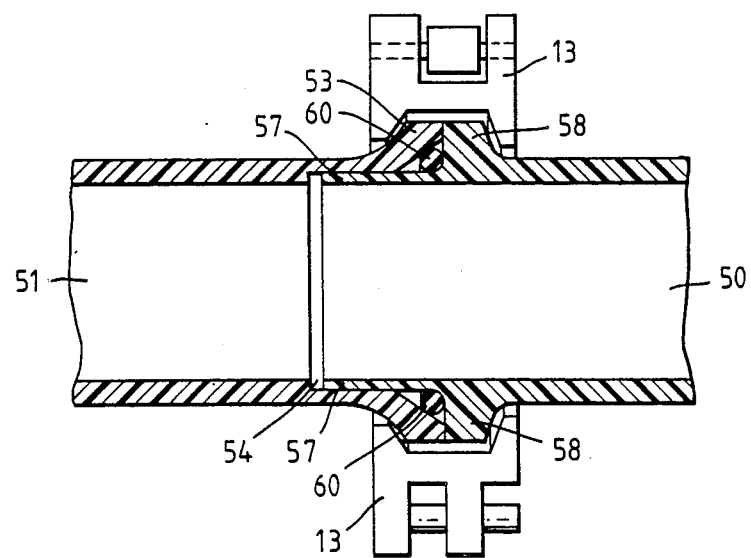

FIGS. 7a and 7b show a further embodiment of the present invention suitable for protecting cable joints in confirmed spaces. This embodiment of the cable joint cover comprises two short cylindrical sleeves 50,56 wherein and 31 of cylindrical sleeve 50 mates with end 54 of cylindrical sleeve 56 causing flanges 53,58 to butt together and compress O-ring 60. Circular clamp 13 releasably secures the two cylindrical sleeves 50,56 together. The open ends 62,64 of the butted sleeves 50,56 may be sealed by way of end-cap 12 and circular clamp 13 as previously described. Removal of circular clamps 13 enables the cylindrical sleeves 50,56 to be slid outwards over end-caps 12 in the direction of arrows 55,59 respectively.

Alternatively, the clamping arrangements hereinbefore described with reference to FIGS. 8, 9 and 10 may be used.

For the avoidance of doubt it is here noted that the term telecommunications cable as used herein as well as including metallic and co-axial cables includes other physical transmission media such as cables comprised of optical fibres for example.

I claim:

1. A reusable cable joint cover comprising:
   (a) a hollow sleeve for housing joints between cables;
   (b) a first end cap of smaller external diameter than an internal diameter of said sleeve and sealed to said sleeve by way of a first releasable seal; and
   (c) a second end cap which is sealed by a clamp member to said sleeve by way of a second releasable seal, said sleeve and said second end cap having respective flange members for interacting with said clamp member;
   each of said end caps having a substantially planar inner surface, each said end cap comprising at least one respective cable entry port formed integrally with the cap and terminating coplanar with said substantially planar inner surface, each said cable entry port having an outwardly extending portion for surrounding a respective one of said cables and being permanently sealable to said respective one of said cables at a point longitudinally separated from each respective releasable seal and external of said sleeve.

2. A reusable cable joint cover according to claim 1 in which at least one of said first and second end caps comprises a plurality of cable entry ports formed integrally with the cap, each of said cable entry ports having an externally extending portion for surrounding a respective one of said cables and being permanently sealable thereto externally of said sleeve.

3. A reusable cable joint cover according to claim 2 in which at least one of said plurality of cable entry ports comprises breakable sealing means integrally formed therewith.

4. A reusable cable joint cover according to claim 1 in which each said entry port is sealed to said respective cable by a heat shrink seal.

5. A reusable cable joint cover according to claim 1 in which at least one of said end caps further comprises valve means for permitting pressurization and depressurization of said sleeve.

6. A reusable cable joint cover according to claim 1 in which said first end cap is also releasably sealable to said sleeve by a clamp member, said first end cap having a flange member which extends past an external end face of said sleeve, the clamp member interacting with said flange member and said face to force said end cap towards an internal end face of said sleeve.

7. A reusable cable joint cover as claimed in claim 1 wherein said first end cap has a plurality of flanges extending externally thereof, said flanges being wedge shaped circumferentially of said end cap, and a clamp ring having a corresponding plurality of complimentary wedge shaped flanges extending internally thereof, the end cap being releasably sealable to the sleeve by interaction of the respective wedge shaped flanges of the clamp ring and the end cap.

8. A resuable cable joint cover comprising:

(a) two hollow sleeves butted together and sealed to each other by way of a first releasable seal, for housing joints between cables; and (b) two end caps each of smaller external diamter than an internal diameter of said sleeves each sealed one to each of a respective non-abutting end of said hollow sleeve by way of a second releasable seal; each of said end caps having a substantially planar inner surfaces, each said end cap comprising at least one respective cable entry port formed integrally with the cap and terminating coplanar with said substantially planar inner surface, each cable entry port having an outwardly extending portion for surrounding a respective one of said cables at a point longitudinally separated from each respective releasable seal an external of said sleeve.

9. A reusable cable joint cover according to claim 8, wherein each end cap has a respective plurality of flanges extending externally thereof, said flanges being wedge shaped circumferentially of said respective end cap, and a plurality of clamp rings having a respective plurality of complimentary wedge shaped flanges extending internally thereof, said end caps being releasably sealable to their respective sleeves by the interaction of the respective wedge shaped flanges of the clamp rings and the end caps.

* * * * *